US006597730B1

(12) United States Patent
Bader

(10) Patent No.: US 6,597,730 B1
(45) Date of Patent: Jul. 22, 2003

(54) SATELLITE COMMUNICATION ARRAY TRANSCEIVER

(75) Inventor: Todd R. Bader, Sunnyvale, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/432,370

(22) Filed: Nov. 3, 1999

(51) Int. Cl.[7] .................................................. H04B 1/38
(52) U.S. Cl. ........................................ 375/219; 375/141
(58) Field of Search ................................. 375/219, 140, 375/141, 146, 147, 260, 267

(56) References Cited

U.S. PATENT DOCUMENTS 5,659,572 A * 8/1997 Schilling .................... 375/138
6,115,406 A * 9/2000 Mesecher ................... 375/130

* cited by examiner

*Primary Examiner*—Stephen Chin
*Assistant Examiner*—David B. Lugo

(74) *Attorney, Agent, or Firm*—John A. Miller; Warn, Burgess & Hoffmann, P.C.

(57) ABSTRACT

A satellite communications system (10) that employs an array of separate and easily deployable antennas (12) for transmission and reception purposes to accommodate high data rate transmissions. The antennas (12) can be deployed randomly at a communications site and are physically separated. Each antenna (12) transmits and receives the same information. A coded signal is used to identify the transmission from each antenna (12) for calibration purposes to align the bits transmitted by each antenna (12) and provide carrier frequency phase matching. The coded signals are used to compare the phase and timing relationship between each antenna signal and a reference antenna signal when the separate antennas receive all of the coded signals. Correction computations are performed and specialized phase and data alignment systems (24, 32) are employed to delay and adjust the phases of the various transmitted signals relative to the reference antenna (12) to provide the desired alignment. Additionally, phase and timing systems (194) are used to determine and correct the phase and data variations between the data received by the antennas (12) so that they can be combined and processed.

22 Claims, 5 Drawing Sheets

SATELLITE COMMUNICATION ARRAY TRANSCEIVER

BACKGROUND OF THE INVENTION

1. Field of the Invention

This invention relates generally to a communications array transceiver and, more particularly, to a transceiver for a satellite communications system that employs an array of small, readily transportable antennas that transmit signals that are in phase and aligned in time with each other.

2. Discussion of the Related Art

The military requires robust, reliable and increasingly wideband communications systems to provide for the rapid collection and dissemination of intelligence data and tactical command and control information. There is a great tactical value in providing timely data to, and reports from, mobile units in the field that may be in a hostile environment. Satisfaction of this need requires that communications links be established quickly between the field unit and a remote, sometimes transcontinental, site. It has been recognized that communications by satellite provides the required access in this type of environment.

Modern strategic and tactical communications of this type typically require wide bandwidth communications, for example 40 megabits per second. A certain amount of energy is required for each bit that is to be transmitted. The more bits transmitted per second, the more energy is required per unit time, and thus the more power for the transmission is required. Similarly, a certain amount of energy per bit is required to receive a communication, and wider bandwidth communications require more signal power to be received. The system's transmission power requirements can be reduced and its receiving power collection capacity can be increased by increasing the antenna gain, which is achieved by increasing the size of the antenna. Therefore, large reception and transmission apertures are usually necessary to supply the gain to handle wide bandwidth signals. For example, to transmit 40 megabits per second in the Ku frequency band, it is desirable to have an antenna that is about 10 meters in diameter.

State of the art satellite communications systems are almost exclusively constructed of a single antenna that has a large aperture and a corresponding large high power amplifier to achieve high sensitivity and high equivalent isotropic radiated power (EIRP) for wide bandwidth communications. Typically, the combination of the large size of the aperture and the amplifier provide a communications system that is unwieldy for rapid deployment in unfriendly terrains. It is possible to transmit the higher data rate signals at lower power by combining identical transmissions from a plurality of smaller, more readily deployable antennas. However, in order to provide such a system, the transmitted bits from each separate antenna must be aligned in time with each other, and the radio frequency carrier transmitted by each antenna must be in phase with each other.

It is known to use phased array antennas to improve sensitivity and EIRP by phasing transmitted and/or received signals. The phased array antennas are typically constructed of a fixed, permanent, rigid physical configuration with closely spaced antenna elements that do not require or implement delay compensations. A variation of this type of antenna is a phased array design that implements "true time delay" for each element as a means of adjusting the phase of each element. Known designs of this type, however, require and implement delays that have a known relationship from element to element and do not require and do not implement delays that are arbitrary as a result of an arbitrary physical disposition of the elements.

One known commercial satellite communications system that employs more than one antenna is the TACSTAR MK-II, available from Datron/Transco Inc. This system performs phase combining with two independent antenna elements. In this design, the antenna operates only in the receive mode with two closely spaced antenna elements for narrowband signals that do not require delay compensation.

What is needed is a satellite communications system that provides transmission and reception of wideband signals, and includes antennas and corresponding equipment that is easily deployable, rugged, reliable and secure. It is therefore an object of the present invention to provide such a communications system.

SUMMARY OF THE INVENTION

In accordance with the teachings of the present invention, a satellite communications system is disclosed that employs an array of separate and easily deployable antennas for transmission and reception purposes to accommodate high data rate transmissions. The antennas can be deployed randomly at a communications site, and are physically separated. Each antenna transmits and receives the same data. A coded signal is used to identify the transmission from each antenna for calibration purposes to align the bits transmitted by each antenna in time and provide phase matching for the carrier wave of each antenna signal. The coded signals are used to compare the phase and timing relationship between each antenna signal and a reference antenna signal when the reference antenna receives all the coded signals for all of the antennas. Correction computations are performed and specialized phase and data alignment systems are employed to delay the various transmitted signals relative to the reference antenna to provide the desired alignment. Additionally, phase and timing systems are used to determine and correct the phase and data timing variations between the data received by the antennas so that they can be combined and processed.

Further objects, features and advantages of the present invention will become apparent from a consideration of the following description and the appended claims when taken in conjunction with the accompanying drawings.

DETAILED DESCRIPTION OF THE PREFERRED EMBODIMENTS

The following discussion of the preferred embodiments directed to a satellite communications system including an array of antennas is merely exemplary in nature, and is in no way intended to limit the invention or its applications or uses.

Figure 1:
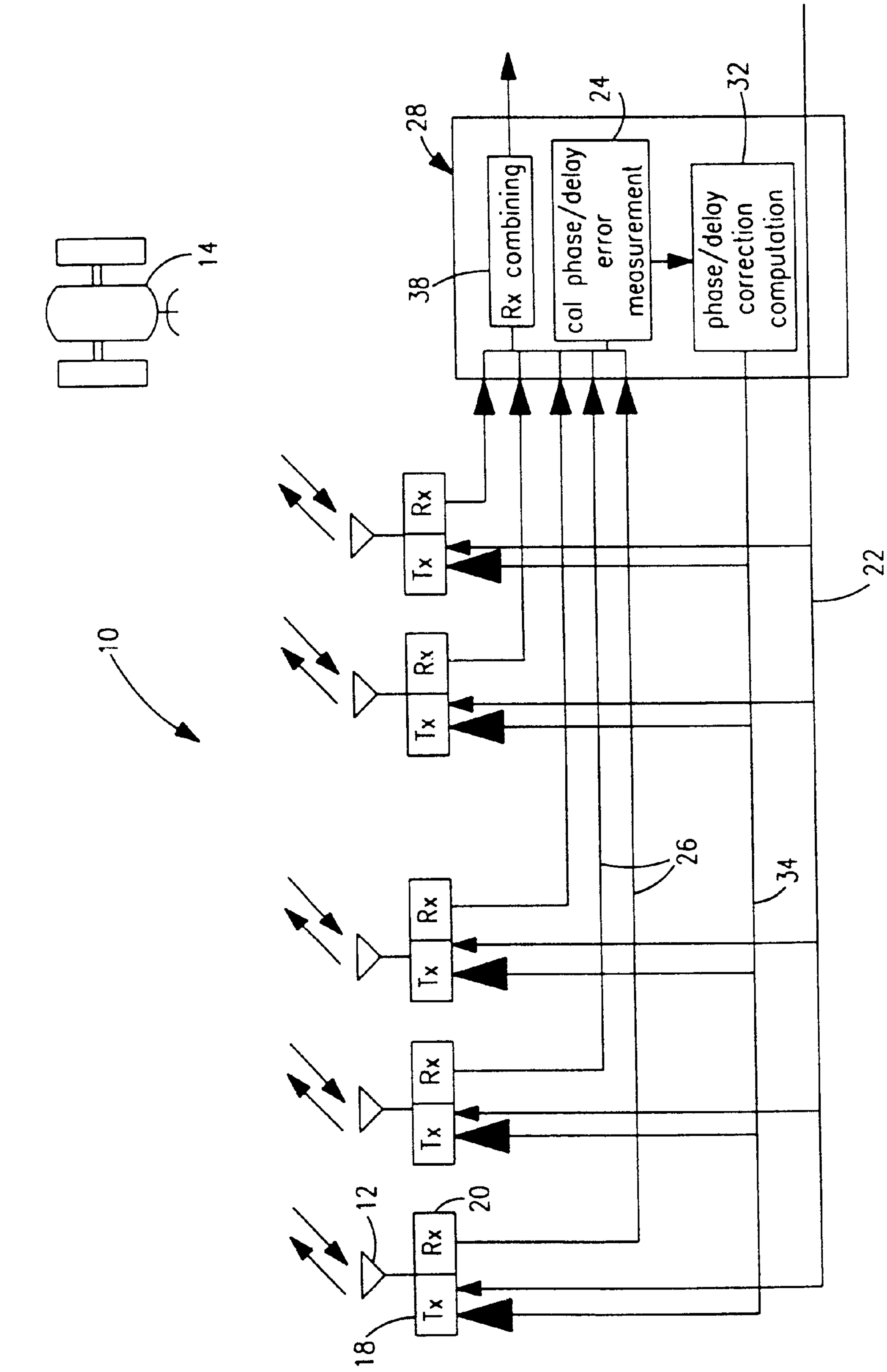
FIG. 1 is a functional block diagram of a transceiver array for a satellite communications system, according to an embodiment of the present invention.

FIG. 1 is a schematic block diagram of an antenna array transceiver 10, according to an embodiment of the present invention. The transceiver 10 includes an array of antennas 12 that transmit to and receive signals from a satellite 14. The satellite 14 then rebroadcasts the signal to another satellite and/or to an Earth based receiver that the transceiver 10 is in communication with. Each antenna 12 includes a transmitter 18 and a receiver 20. Each combination of antenna 12, transmitter 18 and receiver 20 is a separate channel of the transceiver 10. The antennas 12 are positioned on the Earth at random locations at a communications site. Each antenna 12 transmits and receives the same data so that the combination of all the transmissions and receptions provides enough power for the necessary or required bandwidth for a particular application. The number of antennas 12 for a particular application would be determined by the bandwidth required in combination with the actual size of each antenna 12.

Because the location of the antennas 12 on the Earth relative to the satellite 14 is arbitrary, a phase and bit alignment correction needs to be made to insure that the carrier signal associated with the transmitted signals from the antennas 12 arrive at the satellite 14 in phase with each other, and the bits being transmitted by each channel arrive at the satellite 14 at the same time. According to the invention, the phase relationship and the bit alignment relationship between the various signals transmitted by the antennas 12 are aligned by employing a unique calibration signal for each antenna 12 that is transmitted in combination with the desired data. Each calibration signal includes its own code so that the separate signals from each of the antennas 12 can be distinguished from each other. The calibration signal can be a binary pseudo-random sequence waveform that is transmitted at very low power and a low temporal duty cycle. In one embodiment, the calibration signals transmitted by the separate antennas 12 are coded by a spread spectrum code. The combined calibration signal and data signal are sent to the several transmitters 18 for each channel on line 22. The calibration signal is modulated onto the same radio frequency carrier as the data signal so that the phase of the calibration signal and the phase of the data signal are locked together.

The combination of the data signal and the calibration signal are transmitted by the antennas 12 and received by the satellite 14. The satellite 14 rebroadcasts the combined signal, at a different carrier frequency, to be received by each of the antennas 12. Because the calibration signal is transmitted at a much lower power than the data signal, it does not interfere with the data signal.

Each of the receivers 20 receives all of the coded calibration signals transmitted by all of the antennas 12. Each of the calibration signals from each of the 10 receivers 20 is sent to a calibration phase/delay error measurement system 24 on lines 26 within a processor 28. One of the channels is designated a reference channel, and is the channel with the longest round trip time to and from the satellite 14. The measurement system 24 uses the calibration signals received by the reference channel to separate and identify the signals by their codes. In other words, the calibration signals from the receiver 20 of the reference antenna are used by the measurement system 24 to determine the phase relationship between the carrier frequency of the reference channel and the carrier frequency of all of the other channels. Additionally, the measurement system 24 measures the time delay between the calibration signal for the reference channel and the calibration signal from the other channels.

The measurement of the phase and delay between the signal from the reference channel and the signal from each of the other channels identified by the measurement system 24 is then applied to a phase/delay correction computation system 32 that determines how much the transmissions from the various antennas 12 must be delayed in time and changed in phase relative to the transmission from the reference antenna so that the carrier waves from each antenna 12 arrive at the satellite 14 in phase, and all of the data is aligned in time. This information from the computation system 32 is applied to the transmitters 18 on line 34. Because the data signal is phase locked to the calibration signal, the corrected calibration signal causes the data signal from each antenna 12 to also be in phase and aligned in time.

Phase and data alignment must also be provided for the signals received by the antennas 12 from the remote communications site. To provide this alignment, each of the received signals from the receivers 20 are also sent to a receiver combining system 38. The combining system 38 processes the various signals so that the carriers are aligned in phase, and data aligned in time, and sums the aligned signals together. Various receiver combining schemes are known in the art that provide this type of function. In one particular scheme, the various signals received by the antennas 12 are cross-correlated relative to each other. The cross correlation between the received signals gives the phase difference between the signals and their relative delay.

Figure 2:
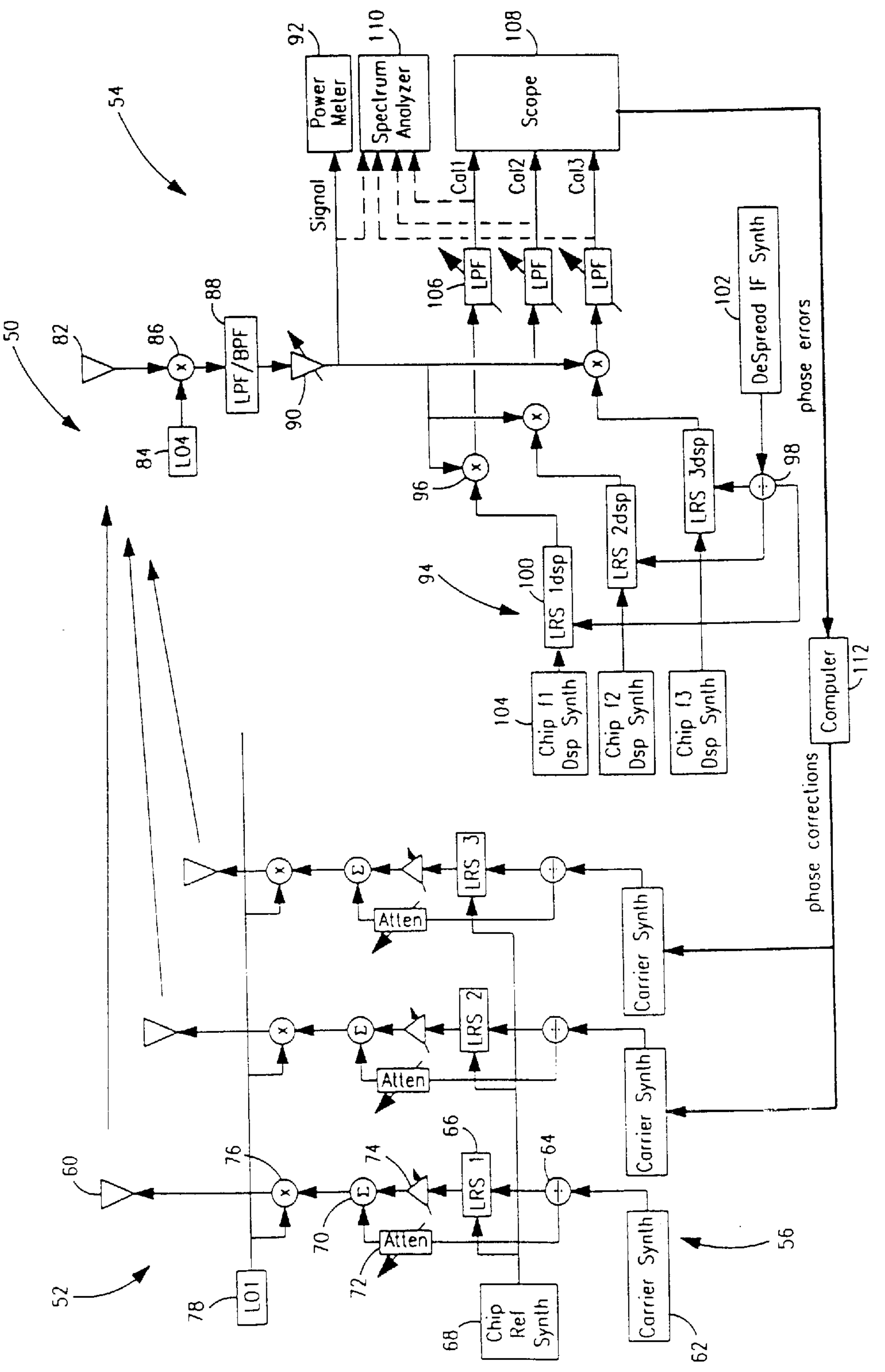
FIG. 2 is a functional block diagram of a communications system incorporating a transceiver array of the invention used for laboratory verification.

FIG. 2 is a schematic block diagram of a communications system 50 showing a laboratory depiction of the phase alignment technique to align the transmitted signals of the invention described above. The system 50 includes a transmitter 52 and a receiver 54. The transmitter 52 includes three separate channels 56, where each channel transmits a separate coded calibration signal. Because each channel 56 is the same, only one channel will be described with the understanding that the other two channels operate in the same manner. The channel that is described is the reference channel.

Each channel 56 includes an antenna 60 for transmitting the combined calibration and data signal. Each channel 56 also includes a carrier synthesizer 62 that generates a carrier signal, 70 MHz in this example. The carrier signal is sent to a divider 64 that divides the signal into first and second paths. The first path is connected to a linear recursive sequence random number generator 66. The generator 66 provides a predetermined sequence of zero and one bits that defines the calibration code for that channel. The calibration code modulates the carrier frequency from the synthesizer 62. The generator 66 also receives a signal from a chip reference synthesizer 68. The chip reference synthesizer 68 is a clock input to the generator 66 that determines the rate at which the zero and one bits are generated in the generator 66. The coded modulated carrier wave from the generator 66 is applied to a summer 70 through an amplifier 74.

The second split carrier signal from the divider 64 is applied to the summer 70 through an attenuator 72 as an unmodulated signal. The unmodulated signal represents the data signal even though it is not modulated with actual data in this laboratory example. It is not necessary to transmit data in this example because it is the calibration signal that is the focus. The attenuator 72 and the amplifier 74 combine to set the relative power between the data signal and the coded signal so that they have different powers and do not interfere with each other. The summer 70 combines the data signal and the calibration signal so that they are locked in phase. The summed signal from the summer 70 is applied to a multiplier 76 along with a high frequency signal from a local oscillator 78. The local oscillator signal upconverts the signal to be transmitted by the antenna 60 and generates, for example, a 12 GHz+/−70 MHz signal. Each channel 56 generates a separately coded signal that is transmitted at the same carrier frequency, where the data signal is phase locked to the calibration signal.

The transmitted signals from the antennas 60 for each channel 56 are received by a receiver antenna 82 in the receiver 54. The antenna 82 represents any one of the antennas 12 and is preferably the reference channel. The signals received by the antenna 82 are multiplied with a local oscillator signal from a local oscillator 84 in a multiplier 86 to provide a difference signal that will be used as an intermediate frequency for downconversion purposes. In this example, the frequency of the local oscillator 84 is 11,860 GHz to provide the intermediate frequency of about 70 MHz, as used in the transmitter 52. A low pass filter/bandpass filter 88 filters out the sum signal and the harmonics from the multiplier 86, and passes the intermediate frequency signal through to be amplified by an amplifier 90. The amplified intermediate signal is sent to a power meter 92 to provide a measurement of the received power.

The amplified intermediate frequency signal is also sent to three separate channels 94 in the receiver 54 to separate the codes for each of the channels 56. Each channel 94 operates in the same manner, and therefore only one channel will be described with the understanding that the other two channels operate in the same manner.

The signal from the bandpass filter 88 includes all three of the coded calibration signals from the channels 56. This signal is applied to a multiplier 96 in each channel 94. Each code that was generated in the transmitter 52 is also reconstructed in the receiver 54. To accomplish this, a code generator 100 is used to generate the codes, and is similar to the generator 66. The generator 100 receives a despread intermediate frequency signal, for example 70 MHz, from a despreader synthesizer 102, that is modulated by the particular zero and one bit code in the code generator 100. A divider 98 is used to divide the signal from the synthesizer 102 so that each channel 94 receives the same carrier frequency. A chip despreader synthesizer 104 provides the clock input to the code generator 100 to provide the rate at which the ones and zeros are generated. The coded signal is thus generated in the same manner as in the transmitter 52. The coded signal at the intermediate frequency from the code generator 100 is then applied to the multiplier 96 to be multiplied with the intermediate frequency signal received by the antenna 82. By multiplying the received calibration signal with the locally generated coded signal, the like codes cancel out. Because the signal from the antenna 82 includes all three codes, only the particular code generated by the code generator 100 is cancelled. The remaining two codes are still present from the output of the multiplier 96. This signal is filtered by a lowpass filter (LPF) 106 that only passes the low frequency carrier of the signal. Thus, only the carrier for the first calibration signal is passed by the LPF 106.

Therefore, for each channel 94, a separate one of the codes is output to an oscilloscope 108. The oscilloscope 108 displays the carriers of the various codes, and provides the phase difference between them. The phase difference between the first coded signal and the second coded signal is supplied to a computer 112, which provides a command to the carrier synthesizer 62 in the second channel in the transmitter 52, and the phase difference between the first coded signal and the third coded signal is applied to the carrier synthesizer 62 in the third channel of the transmitter 52 to provide the phase relationship correction. A spectrum analyzer 110 is also provided to display the power of the received and combined data signal.

Figure 3:
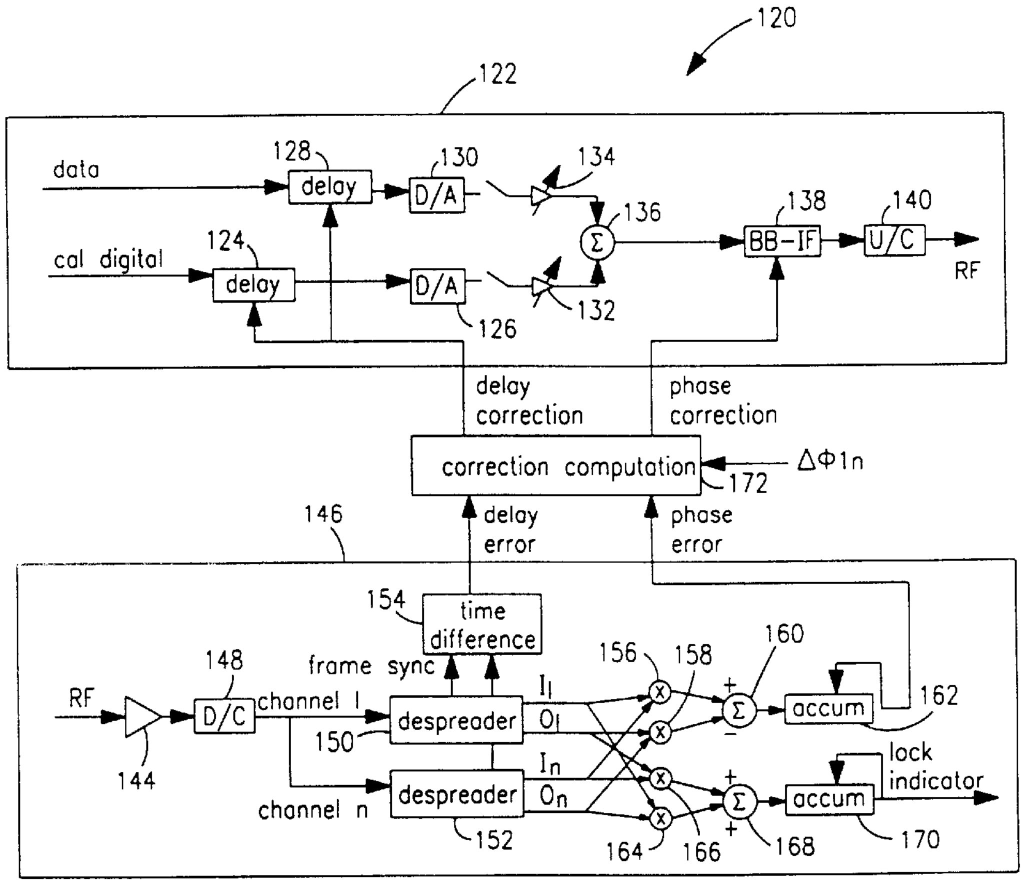
FIG. 3 is a functional block diagram showing a transmission control and error estimation system for a channel of the communications system shown in FIG. 1.

FIG. 3 is a functional block diagram 120 showing how the signals to be transmitted are aligned in phase and are timed relative to each other in the manner described above. The block diagram 120 includes a transmission control system 122 for an n channel that represents any channel that is not the reference channel. The calibration signal, generated as discussed above, in this channel is applied to a delay device 124 for bit alignment purposes, as will be discussed below. Because the calibration signal is digital, it is converted to an analog signal by a digital-to-analog (D/A) converter 126 for transmission. Likewise, the digital data signal to be transmitted is sent through a delay device 128, and then to a digital-to-analog converter 130 to be converted to an analog signal for transmission. Amplifiers 132 and 134 amplify the calibration signal and the data signal, respectively. The amplified calibration and data signals are phase locked together in a summer 136 for transmission. The combined calibration signal and data signal is applied to a base-band (BB) to IF conversion system 138 that modulates the base-band data and the calibration signal onto an IF carrier wave. The intermediate frequency carrier signal is then upconverted to a high frequency (12 GHz) by an upconverter 140 suitable for transmission.

The RF transmission from the transmission control system 122 is sent to the satellite 14. All of the antennas 12 receive all of the calibration signals from all of the channels. In the reference channel, the antenna 12 sends the received signals to an amplifier 144 in an error measurement system 146 in the receiver 20. A downconverter 148 converts the high frequency carrier signal to a suitable IF for processing. A despreader 150 is provided to decode the reference channel signal and a despreader 152 is provided to decode the n channel signal. The despreaders 150 and 152 each provide a frame sync output that is indicative of the timing of the data and calibration code of the received signal for the reference channel and the n channel. The frame sync signals are received by a time difference system 154 that acts to identify the relative alignment between the frame sync signals. The output of the time difference system 154 is a signal indicative of the alignment between the data and calibration code in the n channel and the data and calibration code in the reference channel. The alignment between the signal for each channel and the reference channel is performed in this manner.

The despreaders 150 and 152 decode the signals by removing the digital code for that channel and leaving the IF carrier for a particular signal. In other words, the despreader 150 receives all of the coded signals for all the channels, but only outputs the carrier signal for the particular code associated with the reference channel because the code in the despreader 150 only selects the code for that channel. The despreader 152 does the same for the n channel. The despreaders 150 and 152 separate the carrier signals for the particular code into in-phase and quadrature-phase signals. The in-phase signals from the despreaders 150 and 152 are sent to a multiplier 156, and the quadrature-phase signals from the despreaders 150 and 152 are sent to a multiplier 158. The multiplied in-phase and quadrature-phase signals from the reference channel and the n channel are then applied to a summer 160 that subtracts the signals to generate a difference signal that gives the sine of the phase difference between the carrier signals. The difference signal is sent to an accumulator 162 that accumulates the sine difference to provide a phase error output of the difference in phase of the carrier signals for the reference channel and the n channel.

The in-phase and quadrature-phase signals from the despreaders 150 and 152 are also applied to multipliers 164 and 166. The multiplied signals from the multipliers 164 and 166 are then applied to a summer 168 that adds the signals to provide the cosine of the phase difference between the signals. An accumulator 170 accumulates the added cosines and provides a lock indicator output indicative of when the phase error between the reference channel and the n channel is reduced to zero, indicating the signals are in-phase.

Both the delay error signal from the difference system 154 and the phase error signal from the accumulator 162 are applied to a correction computation system 172 that determines the amount of delay needed to align the n channel with the reference channel, and the phase adjustment needed to cause the n channel carrier signal to be in phase with the reference channel carrier signal. A delay correction signal from the correction computation system 172 is then sent to the delay devices 124 and 128 to delay the calibration and data signals of the n channel and align them with the calibration signal and data signals in the reference channel. A phase correction signal is sent to the conversion system 138 to provide a phase correction to the n channel carrier signal. Therefore, the RF signal transmitted by the antenna 12 in the n channel is aligned in time and in phase, as it is seen by the satellite 14, with the RF signal transmitted by the reference channel. This delay and phase adjustment process is done for all the channels relative to the reference channel so that all of the channels are aligned in time and in phase with the reference channel, and thus with each other.

Figure 4:
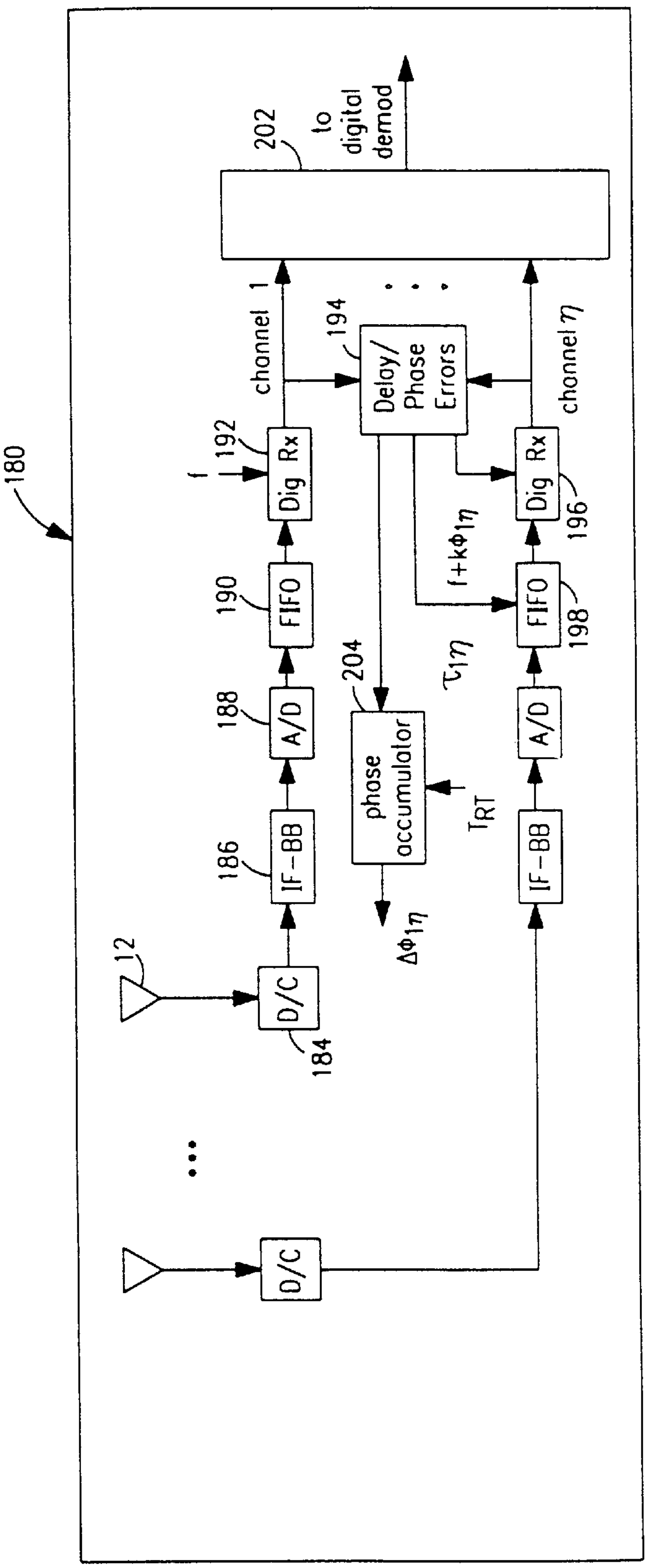
FIG. 4 is a functional block diagram showing a receiver combining method of the communications system shown in FIG. 1.

FIG. 4 is a functional block diagram 180 showing how signals received from a remote communications site are aligned in phase and in time, and combined, for all the channels. Each one of the channels is represented in FIG. 4, including the reference channel 1. The receiver functions of the reference channel 1 will be discussed below, with the understanding that the other channels receive and process the signals in the same manner. Each antenna 12 receives the same signals from the satellite 14. The signals received by the antenna 12 in the reference channel are downconverted by a downconverter 184 to an intermediate frequency, and then from an intermediate frequency to base-band by a converter 186. The base-band signal is then converted to a digital signal by an analog-to-digital converter 188. The digital signal is then sent to a first-in first-out (FIFO) delay register 190. The downconverted, digital signal from the FIFO register 190 is then sent to a digital receiver 192 that provides digital filtering around an optimum band and further downconversion by an applied frequency f. The digital representation of the signal allows for frequency phase control.

This downconversion and digitizing process as just described is provided for all of the n channels. The digitized signal for each channel is then sent to a delay/phase error system 194. The error system 194 separately computes the delay difference and the phase difference between the digital reference channel signal and the digital signal for each of the other channels. This delay and phase error determination can be done in any number of different ways known to those skilled in the art. One example is a cross-correlation technique. The delay $t_{1n}$ and the phase error $k\phi_{1n}$ computed by the system 194 for each channel are applied to the delay register and the digital receiver, respectively, in each of the channels to align them with the reference channel. The frequency f plus the phase error $k\phi_{1n}$ between the n channel and the reference channel is applied to a digital receiver 196 in the n channel so that the phase of the low frequency narrow band signal in the digital receiver 196 is matched to the frequency in the digital receiver 192. Likewise, the time difference signal $t_{1n}$ is applied to a FIFO register 198 in the n channel to provide a delay to the received signal to align the n channel with the reference channel 1. Therefore, the low frequency signal from the digital receiver 196 is aligned in time and phase with the signal from the digital receiver 192. This process is performed for the other channels relative to the reference channel 1.

All of the aligned signals from all of the channels 1–n are sent to a combiner 200 that adds the signals to a single signal representative of the received signal. The combined signal is then sent to a digital demodulator where the digital low frequency carrier wave is removed and the digital data is identified.

The round trip time $T_{RT}$ of the transmission of the calibration signal from the antennas 12 to the satellite 14 and then from the satellite 14 to the antennas 12 is typically on the order of one-quarter of a second. For land based deployment of the array transceiver, the phase and time differences between channels change sufficiently slowly that this round trip time does not affect the measurement and correction process as just described. However, if the communication site is on a ship or the like, where the relative orientation between the antennas 12 and the satellite 14 may change significantly during the transmission round trip time of the calibration signal, relative phase changes due to the movement of the antennas 12 relative to the satellite 14 and each other need to be compensated for during this time. Therefore, an output signal from the system 194 is provided that is representative of the continually measured phase difference between the reference channel and each n channel, and is sent to a phase accumulator 204. Additionally, the round trip time $T_{RT}$ is applied to the phase accumulator 204. The phase accumulator 204 continually adds up the phase differences for each of the channels for the round trip time, and outputs the phase change as $\Delta\phi_{1n}$ in to the correction computation system 172. The correction computation system 172 computes the phase correction at the transmission frequency that compensates for the short term phase change $\Delta\phi_{1n}$ that was measured at the receiving frequency. The short term phase change due to transceiver motion is thereby accounted for.

Figure 5:
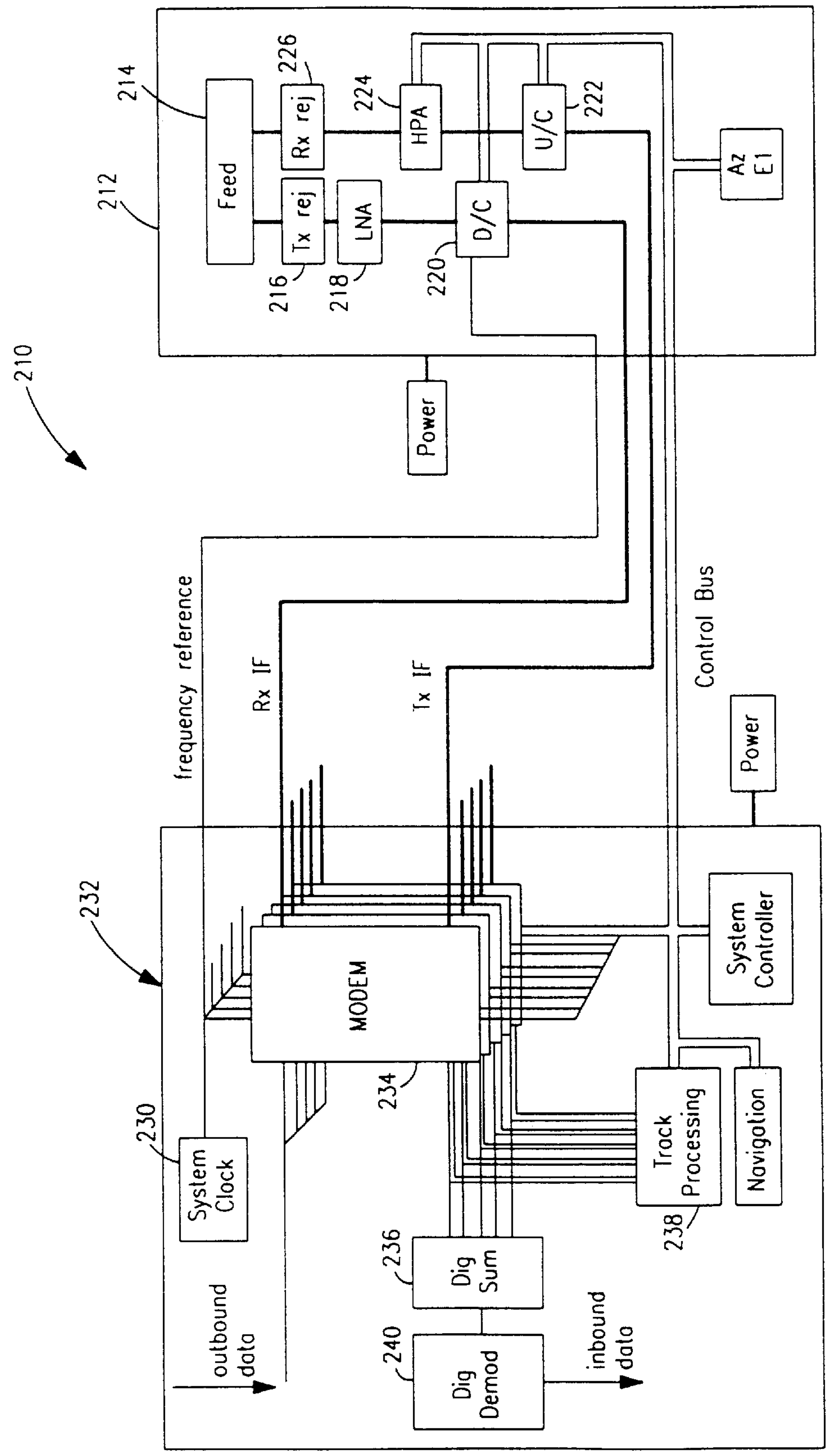
FIG. 5 is a block diagram of a system architecture for the communications system shown in FIG. 1.

FIG. 5 shows an example of a system architecture 210 for a particular implementation of the system described above. The architecture 210 includes an antenna platform 212 that includes an antenna feed 214 connected to the antenna 12. The received signals from the antenna 12 go through a transmission reject system 216, a low noise amplifier (LNA) 218, and are downconverted by a down-converter 220 to generate the intermediate frequency received signal. The signals to be transmitted are sent to an up-converter 222 to upconvert the signal to a higher frequency, and then to a high power amplifier (HPA) 224, through a receiver reject system 226 and then to the antenna feed 214. A frequency reference input signal is applied to the downconverter 220 and the upconverter 222 from a system clock 230 to lock the signals to a particular frequency.

The system clock 230, in a control platform 232, provides timing for the various operations. A modem 234 is provided for each channel, where the modem 234 includes everything in the error measurement system 146 after the downconverter 148, and also includes the converter 186, the analog-to-digital converter 188, the FIFO register 190, and the digital receiver 192. A digital summer 236 represents the combiner 202. A track processing system 238 includes the phase accumulator 204, the delay-phase error system 194 and the correction computation system 172. A digital demodulator 240 demodulates the digital data received from the summer 236.

The foregoing discussion discloses and describes merely exemplary embodiments of the present invention. One skilled in the art will readily recognize from such discussion, and from the accompanying drawings and claims, that various changes, modifications or variations can be made therein without departing from the spirit and scope of the invention as defined in the following claims.

What is claimed is:

1. A transceiver for receiving and transmitting signals, said transceiver comprising:

an array of antennas, each of the antennas being randomly positioned relative to each other, each of the antennas identifying a separate channel of the transceiver where one of the channels is a reference channel, each channel receiving and transmitting signals on a common carrier frequency including the same data;

a code generation system, said code generation system generating a unique calibration signal for each channel, each channel transmitting its calibration signal and receiving the calibration signals from all of the channels;

an alignment error system, said alignment error system generating an alignment error signal that identifies an alignment error between the calibration signal transmitted by each channel and the calibration signal transmitted by the reference channel;

a phase error determination system, said phase error determination system determining a phase error signal that is the difference between the phase of the carrier signal transmitted by each channel and the phase of the carrier signal transmitted by the reference channel; and a correction system, said correction system generating a time correction for each channel that aligns the calibration signal transmitted by each channel with the calibration signal transmitted by the reference channel and generating a phase correction signal that aligns the phase of the carrier signal transmitted by each channel and the phase of the carrier signal transmitted by the reference channel.

2. The transceiver according to claim 1 wherein the correction system includes a delay device in each channel for delaying the calibration signal for that channel relative to the calibration signal for the reference channel.

3. The transceiver according to claim 1 wherein the calibration signal in each channel is phase locked to a data signal for that channel.

4. The transceiver according to claim 1 wherein the alignment error system and the phase error system include a decoder for each channel, each decoder identifying the code for its channel from the codes of all of the channels.

5. The transceiver according to claim 4 further comprising a time difference system, said time difference system being responsive to a frame sync signal from each decoder that identifies a position of the calibration signal in time, said time difference system outputting a delay error for each channel that is representative of the delay necessary to align the calibration signal for each channel with the calibration signal for the reference channel.

6. The transceiver according to claim 4 wherein each decoder generates in-phase and quadrature-phase signals of the carrier signal transmitted by each channel, and wherein the phase error system includes a plurality of multipliers, wherein a pair of multipliers multiply the in-phase and quadrature-phase signals for each channel and the reference channel.

7. The transceiver according to claim 6 wherein the phase error system further includes a plurality of summers, each summer generating a difference signal between the multiplied in-phase and quadrature-phase signals for each channel and the reference channel, said phase error system further comprising a plurality of accumulators, wherein each accumulator receives a difference signal from a summer and generates the phase error signal.

8. The transceiver according to claim 1 further comprising a receiver combining system that determines a bit timing difference and a phase difference between the signals received by the reference channel and the signals received by the other channels, said combining system providing a bit time aligning signal and a phase correction signal for each channel.

9. The transceiver according to claim 8 wherein each channel includes a delay device and a digital receiver, said delay device receiving the time aligning signal to delay the received signals a predetermined amount and said digital receiver receiving the phase correction signal to phase align the received signals.

10. The transceiver according to claim 8 further comprising a phase accumulator, said phase accumulator being responsive to the phase difference from the combining system and a round trip time signal indicative of a round trip time between the transceiver and a satellite, said accumulator outputting a phase signal to the correction system.

11. The transceiver according to claim 8 wherein the receiver combining system includes a digital combiner that combines the aligned signals received by each channel to a single digital output signal.

12. A satellite communications systems for transmitting signals between Earth based communications sites, one of the communication sites including a transceiver comprising:

an array of antennas, each of the antennas identifying a separate channel of the transceiver where one of the channels is a reference channel, each channel receiving and transmitting signals on a common carrier signal and including the same data signal;

a code generation system, said code generation system generating a unique calibration signal for each channel, each channel transmitting its calibration signal and receiving the calibration signals from all of the other channels, said calibration signal being phase locked to the data signal;

an alignment error system, said alignment error system generating an alignment error signal that identifies an alignment error between the calibration signal and the data signal transmitted by each channel and the calibration signal and the data signal transmitted by the reference channel;

a phase error determination system, said phase error determination system determining a phase error signal that is a difference between the phase of the carrier signal transmitted by each channel and the phase of the carrier signal transmitted by the reference channel;

a correction system including a plurality of delay devices, said correction system generating a time correction for each channel that is applied to a delay device in that channel to align the calibration signal and the data signal transmitted by each channel with the calibration signal and the data signal transmitted by the reference channel, said correction system further generating a phase correction signal that aligns the phase of the carrier signal transmitted by each channel and the phase of the carrier signal transmitted by the reference channel; and a receiver combining system, said receiver combining system determining a bit timing difference and a phase difference between data signals received by the reference channel and data signals received by the other channels, said combining system providing a time aligning signal and a phase correction signal for each channel to align the data signals in time and in phase.

13. The transceiver according to claim 12 wherein the alignment error system and the phase error system include a decoder for each channel, each decoder identifying the code for its channel from the codes of all of the channels.

14. The transceiver according to claim 13 further comprising a time difference system, said time difference system being responsive to a frame sync signal from each decoder that identifies a position of the calibration signal in time, said time difference system outputting a delay error for each channel that is representative of the delay necessary to align the calibration signal for each channel with the calibration signal for the reference channel.

15. The transceiver according to claim 13 wherein each decoder generates in-phase and quadrature-phase signals of the carrier signal transmitted by each channel and wherein the phase error system includes a plurality of multipliers, wherein a pair of multipliers multiply the in-phase and quadrature-phase signals for each channel and the reference channel.

16. The transceiver according to claim 15 wherein the phase error system further includes a plurality of summers, each summer generating a difference signal between the multiplied in-phase and quadrature-phase signals for each channel and the reference channel, said phase error system further comprising a plurality of accumulators, wherein each accumulator receives a difference signal from a summer and generates the phase error signal.

17. The transceiver according to claim 12 wherein each channel includes a delay device and a digital receiver, said delay device receiving the time aligning signal to delay the received signals a predetermined amount and said digital receiver receiving the phase correction signal to phase align the received signals.

18. The transceiver according to claim 12 further comprising a phase accumulator, said phase accumulator being responsive to the phase difference from the combining system and a round trip time signal indicative of a round trip time between the transceiver and a satellite, said accumulation outputting a phase signal to the correction system.

19. A method of receiving and transmitting signals, said method comprising steps of:

arbitrarily arranging a plurality of antennas at a communications site, each of the antennas identifying a separate channel where one of the channels is a reference channel;

transmitting and receiving signals including the same data to and from each antenna;

generating a unique calibration signal that is transmitted by each channel;

receiving all of the calibration signals from all of the channels in each channel;

separately identifying the calibration signal for each channel;

determining an alignment error between the calibration signal for each channel and the calibration signal for the reference channel;

determining a phase difference between the calibration signal for each channel and the calibration signal for the reference channel; and providing a time and phase correction for the calibration signal in each channel so that it is aligned with the calibration signal transmitted by the reference channel.

20. The method according to claim 19 further comprising the step of phase locking the calibration signals with a data signal transmitted by each channel.

21. The method according to claim 19 wherein the step of providing a time and phase correction includes delaying the transmission of the calibration signal in each channel so that it is aligned with the transmission of the reference channel.

22. The method according to claim 19 further comprising the step of determining a bit timing difference and a phase difference between signals received by the reference channel and signals received by the other channels, and providing a time alignment signal and a phase correction signal to align the data and carrier frequency of each signal received by each channel.

* * * * *